F. R. GEBHARDT.
AUTOMATIC WATER TEMPERATURE CONTROL SYSTEM.
APPLICATION FILED FEB. 12, 1914.
1,103,756.
Patented July 14, 1914.
2 SHEETS—SHEET 1.
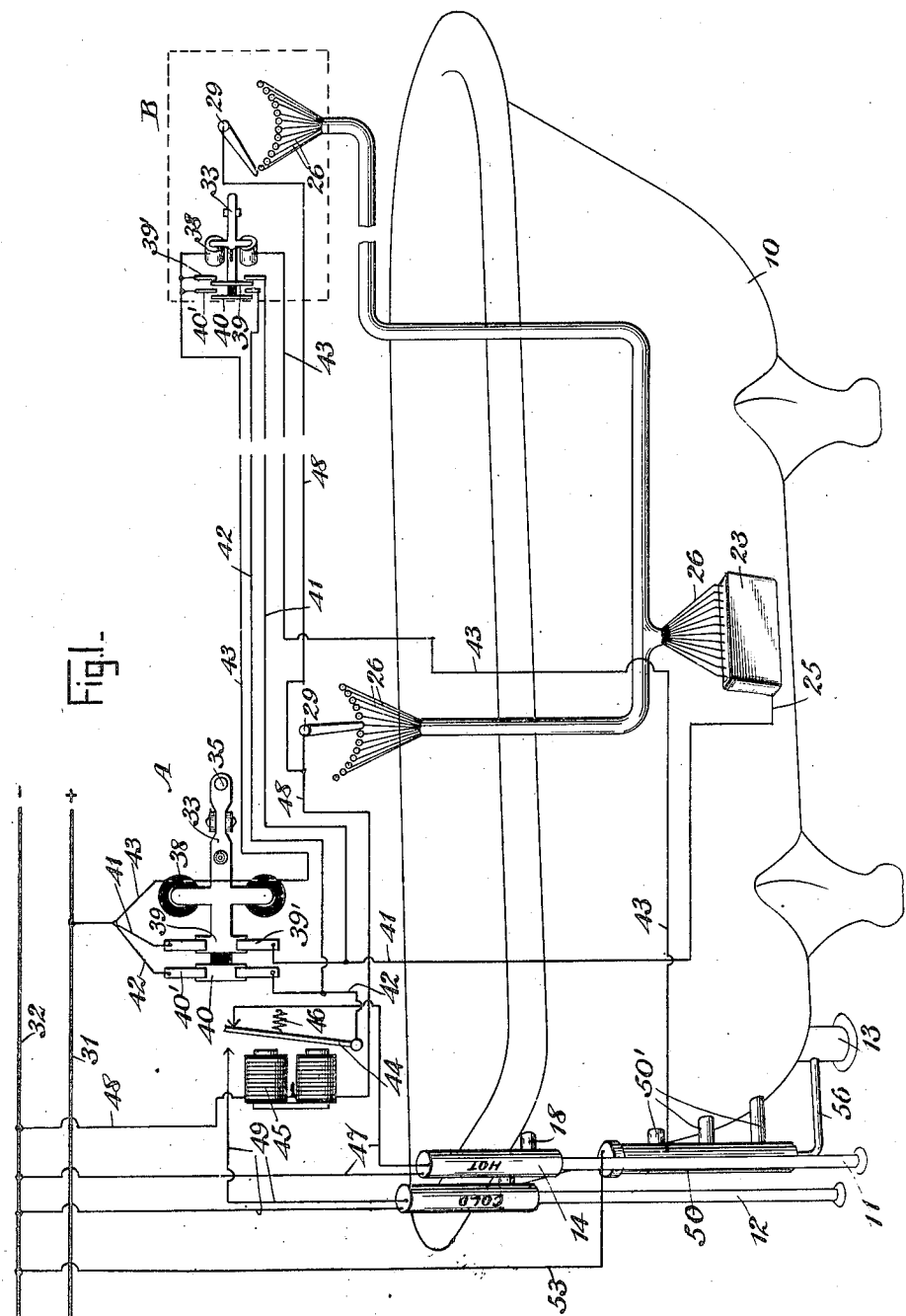
WITNESSES
INVENTOR
Frank R. Gebhardt
BY
ATTORNEYS

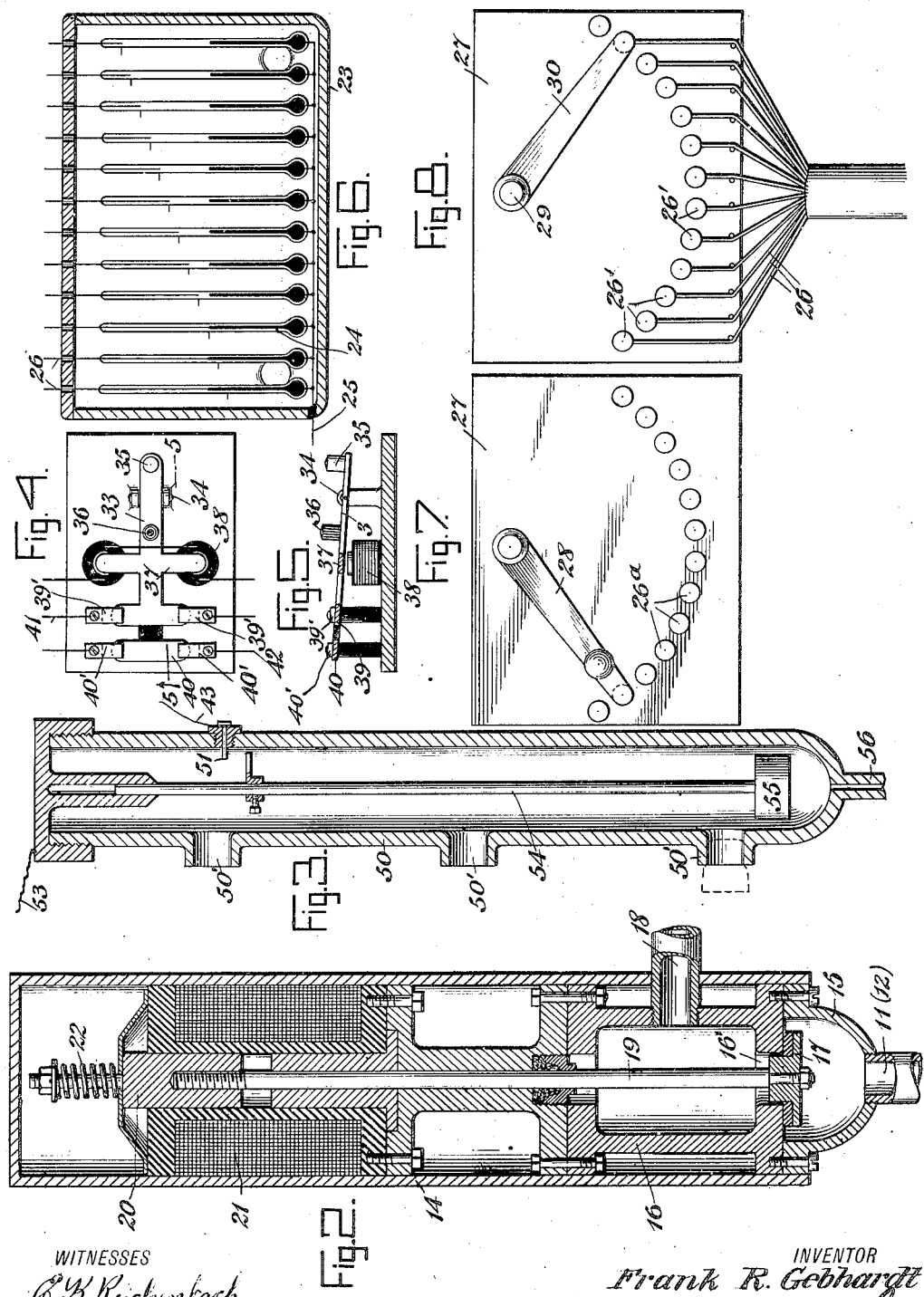

UNITED STATES PATENT OFFICE.

FRANK R. GEBHARDT, OF MONSEY, NEW YORK.

AUTOMATIC WATER-TEMPERATURE-CONTROL SYSTEM.

1,103,756.  Specification of Letters Patent. Patented July 14, 1914.

Application filed February 12, 1914. Serial No. 818,377.

*To all whom it may concern:*

Be it known that I, FRANK R. GEBHARDT, a citizen of the United States, and a resident of Monsey, in the county of Rockland and State of New York, have invented a new and Improved Automatic Water-Temperature-Control System, of which the following is a full, clear, and exact description.

This invention relates to means for controlling a flow of water into bathtubs, washbasins and other receptacles, and has particular reference to means associated with hot and cold water supply pipes whereby an operator at any desired position, either adjacent the receptacle or remote therefrom, may, by simple adjustment of an indicator and the pressing of a button or the like, initiate the automatic control and flow of the water at any desired temperature.

Among the objects, therefore, of the invention, as above premised, is to provide means for the automatic delivery of hot or cold, or mixed hot and cold, water to a bathtub or the like either in the bathroom or in some remote place, means being provided to control the temperature of the water according to the desire at any particular time.

A further object of the invention is to provide, in connection with the same system, a means for automatically shutting off the flow of both the hot and cold water when a certain depth of water in the receptacle is reached.

The foregoing and other objects of the invention will hereinafter be more fully described and claimed and illustrated in the drawings forming a part of this specification in which like characters of reference indicate corresponding parts in all the views, and in which—

Figure 1 is a diagrammatic representation of a preferred embodiment of a system having the improvements of this invention; Fig. 2 is a sectional view of one of the water valves; Fig. 3 is a sectional view of the overflow mechanism for the purpose of providing automatic stopping means for the flow; Fig. 4 is a face view of one of the switch keys; Fig. 5 is a sectional view of the same on the line 5—5 of Fig. 4; Fig. 6 is a vertical sectional view of a thermometer casing which may be used in connection with the receptacle; and Figs. 7 and 8 are respectively outside and inside views of the temperature switch or indicator.

The several parts of this device may be made of any suitable materials, and the relative sizes and proportions, as well as the general design of the mechanism, may be varied to a considerable extent without departing from the spirit of the invention hereinafter more fully described and specifically claimed.

Referring more particularly to the drawings I show at 10 a conventional form of bathtub which, for convenience of expression, will be hereinafter referred to as a tub, and by such term I mean to cover any receptacle which may be employed for the purposes of this invention. Associated with said tub in any usual or preferred manner are hot and cold water supply pipes 11 and 12 and a drain pipe 13. Any suitable valve or spigot mechanism may be employed in connection with the supply pipes adjacent the top of the tub, and for this purpose I show a suitable valve casing 14 connected to the top of either of the supply pipes 11 or 12 by means of a head 15. A thimble 16 is secured within the casing 14 and includes a valve seat 16' against which is normally seated, under the pressure of the water, a valve 17. The valve guards the outflow of the water through the thimble and thence out through a neck 18 leading into the tub. A stem 19 is connected to the valve and leads upwardly into connection with a core 20 of a solenoid 21. A spring 22 may be connected to the core or any other part of the slidable valve member to assist the force of the water in seating the valve or holding it seated when the solenoid is deënergized. This description of the valve mechanism, and as illustrated in Fig. 2, will be understood as being applicable to each of the supply pipes 11 and 12.

Arranged in any suitable position adjacent the bottom of the tub is a thermometer casing 23 having therein any suitable number of thermometers 24, preferably of the same size and construction and preferably on the same level, there being fluid communication between the bottom of the tub and the interior of said casing. The mercury in each of the thermometers is connected with a main wire 25, and individual wires 26 extend preferably from the tops of the thermometer stems. The inner ends of the individual wires 26 are arranged in various graduations as to temperature. The wires 26 are conducted to one or more switch boards 27 located within convenient reach of the operator, either in the bathroom or elsewhere, and said individual wires are connected with corresponding individual terminals 26' on said switch board. A blade 28 in the nature of an indicator or movable switch is connected on the outside of the switch board 27 and is adapted to be moved over any selected one of a series of contacts 26ᵃ communicating with several contact points 26'. The contacts 26ᵃ may bear, if desired, numerals indicating the temperature positions of the free terminals of the wire 26 at the several thermometers. The switch arm 28 is connected to a shaft 29 having on its other end a switch blade 30 coöperating directly with the several contact points 26' on the inside of the switch board.

At 31 and 32 I show two main wires leading from and toward any suitable source of electrical energy.

Referring to Fig. 1 I show what I may term for convenience two control stations A and B, the station A being understood to be located in the bathroom and the station B being in some remote room in the same system. The electrical parts of the stations A and B being substantially alike and arranged in series, the further description will be directed to one of them and such description will be applicable to the other, or any number of such stations might be employed.

The control mechanism comprises a key 33 pivoted at 34 and including white and black buttons 35 and 36 respectively. The shank of the key carries an armature 37 coöperating with an electromagnet 38 and also a pair of contacts 39 and 40. When the white button is pushed, the contacts 39 and 40 are brought into bridging engagement with pairs of contacts 39' and 40' making electrical connections respectively with wires 41 and 42. The electromagnet 38 is connected to a wire 43, and all of the wires 41, 42 and 43 lead from the main wire 31. The wire 41 may constitute or lead to the wire 25 above described as the connection for all of the thermometer bulbs in the casing 23. The wire 42 leads from the contacts 40' to an armature 44 of an electromagnet 45. Said armature is held normally by a spring 46 in connection with a wire 47 leading into the coil of the solenoid 21 in the hot water valve casing and thence out and connected to the return wire 32. The pivot 29 of the switch blade 30 is connected to a wire 48 leading to and through the electromagnet 45 and thence to the return wire 32. When the magnet 45 is energized, the armature 44 thereof breaks the contact with the wire 47 and completes the circuit through the armature from the wire 42 to a wire 49 leading to and through the coil of the solenoid in the cold water casing and thence to the return wire 32. The wire 43 from the electromagnet 38 leads into an overflow casing 50 located outside of the tub near the bottom and through a pair of contacts 51 and 52 and is adapted to be connected with a wire 53 leading to the return main wire 32. The wire 43 is insulated from the casing and the contact 52 is carried by a rod 54 carrying a float 55 adjacent the bottom of the casing. Said rod has electrical connection with the casing and wire 53 which leads therefrom. A plurality of openings 50' lead from the casing 50 into the tub. When the water in the tub reaches a depth sufficient to overflow into the lowermost opening 50', the water will lift the float 55 and make the connection at 51 and 52, completing the circuit through the magnet 38. The action of the magnet will cause the breaking of the circuits through the bridge contacts 39 and 40 and deënergize the solenoids in the casings 14 and stop the flow of water. The small pocket of water admitted into the casing 50 may drain out in due course through the small pipe 56. If more water is desired in the tub than will be determined by the lowermost hole 50', it may be plugged up, leaving the next higher one opened, or any of the lower openings may be plugged up, allowing the water to rise to the height of the uppermost opening 50'.

The operation of the device may be briefly described as follows: A person desiring to deliver water into the tub at approximately a certain temperature, he will set the indicator arm 28 into engagement with the proper contact point 26ᵃ indicating the temperature desired, and the blade 30 will make the desired engagement through the contact point 26' with one of the wires 26. If the temperature desired for the water be not higher than the temperature of the room in which the thermometers 24 are located, the particular wire 26 selected will have metallic connection through the selected thermometer to the wire 25. The operator, upon pressing the white button 35 and bridging the contacts 39' and 40', will start the flow of water through one or the other of the supply pipes 11 and 12, and under the conditions just explained, if the wire 25 is already in metallic contact with the wire 26, the magnet 45 being energized will throw the armature 44 to open the cold water valve. The cold water will flow, therefore, until the temperature in the tub drops below the selected temperature, breaking the contact in the thermometer above referred to. When this break occurs the magnet 45 will be deënergized and the spring 46 will throw the armature 44 over so as to complete the circuit through the wire 47 and hot water valve mechanism. Hot water will flow, then, until the temperature in the body of the tub influences the thermometer and then makes the circuit through the wire 26 and so on in alternation until the desired depth of water will be reached when the flow will be stopped through the overflow float mechanism shown in Fig. 3.

Having thus described my invention, I claim as new and desire to secure by Letters Patent:—

1. In a water control system, the combination of independent hot and cold water valve mechanisms, main circuit wires, connections between the valve mechanisms and the main wires, a make and break device including a movable armature adapted in alternation to complete the circuit through the hot and the cold water mechanisms, means to initiate the flow of water, and temperature control means adjustable in accordance with the temperature desired to determine the action of the make and break device, said temperature control means including a series of thermometers associated with the bottom of the tub, said thermometers having their bulbs on the same level and communicating with one common connecting wire and the several thermometers having individual auxiliary contacts on graduated levels.

2. In a system of the character set forth, the combination with a tub and hot and cold water supply means delivering thereinto, of electrically operated means for controlling the flow of water, said means including a series of thermometers associated with the bottom of the tub, said thermometers having one common connecting wire and each thermometer having its own individual auxiliary contact leading into its stem, the auxiliary contacts of the thermometers being at different levels as to temperature, a make and break device, means to connect the individual wire of the selected thermometer with the make and break device, connections between the make and break device and the water valve mechanisms, and means to initiate the flow of water through the valve mechanisms.

3. The herein described control system for hot and cold water comprising the combination with a tub and means to deliver hot and cold water thereinto according to any desired temperature, of means to automatically stop the flow of water when the desired depth of water is delivered into the tub, said flow stopping means including a vertical casing adjacent the tub, said casing having a plurality of ports leading into the tub at different levels, means to confine the flow of water from the tub to a selected one of said ports when the desired level of water is reached, a drain pipe leading from the bottom of the casing to the drain pipe of the tub independent of the inlet ports, and means within the casing acted upon by the admission of water thereinto serving to complete a circuit and stop the flow of water.

In testimony whereof I have signed my name to this specification in the presence of two subscribing witneses.

FRANK R. GEBHARDT.

Witnesses:
   Geo. L. Beeler,
   Philip D. Rollhaus.